(12) United States Patent
Inayama

(10) Patent No.: US 9,534,639 B2
(45) Date of Patent: Jan. 3, 2017

(54) MULTI-PLATE FRICTION CLUTCH

(71) Applicant: HONDA MOTOR CO., LTD., Tokyo (JP)

(72) Inventor: Tsuguto Inayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/645,506

(22) Filed: Mar. 12, 2015

(65) Prior Publication Data

US 2015/0260236 A1 Sep. 17, 2015

(30) Foreign Application Priority Data

Mar. 17, 2014 (JP) .................................. 2014-053617

(51) Int. Cl.
*F16D 13/56* (2006.01)
*F16D 13/72* (2006.01)

(52) U.S. Cl.
CPC ............... *F16D 13/56* (2013.01); *F16D 13/72* (2013.01); *F16D 2300/24* (2013.01)

(58) Field of Classification Search
CPC .......... F16D 13/52; F16D 13/54; F16D 13/56; F16D 13/72; F16D 13/74; F16D 2300/06; F16D 2300/0214; F16D 2300/24
See application file for complete search history.

(56) References Cited

U.S. PATENT DOCUMENTS

2011/0192699 A1\* 8/2011 Yazaki .................... F16D 13/52
  192/70.12
2013/0256082 A1\* 10/2013 Miyazaki ................ F16D 13/54
  192/70.23

FOREIGN PATENT DOCUMENTS

JP           60-234126 A      11/1985

\* cited by examiner

*Primary Examiner* — Richard Lorence
(74) *Attorney, Agent, or Firm* — Birch, Stewart, Kolasch & Birch, LLP

(57) ABSTRACT

A multi-plate friction clutch wherein lubrication sites of the clutch can be efficiently supplied with oil to be sufficiently lubricated. A multi-plate friction clutch includes a clutch outer, a clutch center, clutch plates, and a pressure plate. A center ring protrusion protruding into a cylindrical shape from the outer surface of a center bottom wall part is formed at substantially the same radial position as a plurality of communication holes. Furthermore, a ring recess opened toward the axial center is formed in the inner circumferential surface of the center ring protrusion and the communication holes are so opened as to face the ring recess.

9 Claims, 8 Drawing Sheets

MULTI-PLATE FRICTION CLUTCH

CROSS-REFERENCE TO RELATED APPLICATIONS

The present application claims priority under 35 USC 119 to Japanese Patent Application No. 2014-053617 filed Mar. 17, 2014 the entire contents of which are hereby incorporated by reference.

BACKGROUND OF THE INVENTION

1. Field of the Invention

The present invention relates to a multi-plate friction clutch.

2. Description of Background Art

A wet multi-plate friction clutch is generally known, wherein a plurality of clutch plates and a plurality of friction plates are alternately disposed in an overlapping manner in a ring-shaped space between an outer cylindrical part of a clutch outer. A center cylindrical part of a clutch center is set between a center bottom wall part of the clutch center and a pressure plate.

To enhance the durability and smoothly perform connection and disconnection, oil needs to be sufficiently supplied to the plurality of clutch plates and the plurality of friction plates alternately overlapped.

In one related-art example, because oil leaking from a bearing for rotatably journaling an outer bottom wall part of the clutch outer around a rotation shaft flows out to a space between the outer bottom wall part and the center bottom wall part, a communication hole (oil conduction hole) that allows the outer surface side and the inner surface side to communicate with each other is formed in the center bottom wall part to thereby supply oil that flows out to the space between the outer bottom wall part and the center bottom wall part to the friction plates and the clutch plates on the inner surface side of the center bottom wall part via the communication hole. See, for example, Japanese Patent Laid-Open No. Sho 60-234126.

In the multi-plate friction clutch disclosed in Japanese Patent Laid-Open No. Sho 60-234126, the oil guided from an oil passage formed in the rotation shaft to the bearing leaks from the bearing and flows out to the space between the outer bottom wall part and the center bottom wall part. Then, part of the oil that has flowed out flows in a centrifugal direction along the outer surface of the center bottom wall part and furthermore part of this oil passes through the oil conduction hole to enter the inner surface side of the center bottom wall part.

The oil that has passed through the oil conduction hole is guided to the inner circumferential surface of the center cylindrical part on the inner surface side of the center bottom wall part and exits from a plurality of small holes formed in the center cylindrical part to the outer circumferential side of the center cylindrical part to be supplied to the clutch plates and the friction plates alternately overlapped.

SUMMARY AND OBJECTS OF THE INVENTION

As described above, part of the oil that has leaked from the bearing and has flowed out to the space between the outer bottom wall part and the center bottom wall part passes through the oil conduction hole and enters the inner surface side of the center bottom wall part to lubricate lubrication sites of the multi-plate friction clutch. Therefore, lubrication with a sufficient amount of oil is difficult.

In particular, in the case of a multi-plate friction clutch in which oil is supplied to the bearing by a scavenging pump, the oil supply to the multi-plate friction clutch is more prone to be insufficient.

An embodiment of the present invention is made in view of this point and an object thereof is to provide a multi-plate friction clutch in which lubrication sites of the clutch can be efficiently supplied with oil and can be sufficiently lubricated. To achieve the above-described object, according to an embodiment of the present invention a multi-plate friction clutch includes:

a clutch outer (50) which has a bottomed cylindrical shape and in which an outer cylindrical part (52) extends along the axial direction from an outer circumferential edge of an outer bottom wall part (51) whose center is journaled by a rotation shaft (21) with the intermediary of a bearing (41);

a clutch center (60) in which a center cylindrical part (62) is formed inside the outer cylindrical part (52) and extends toward the opposite side to the outer bottom wall part (51) from a center bottom wall part (61) whose center is journaled by the rotation shaft (21) with restriction of relative rotation, the center bottom wall part (61) being opposed to an inner surface of the outer bottom wall part (51) and having a plurality of communication holes (61h) formed at an equal distance from the axial center;

a plurality of friction plates (71) engaging with the outer cylindrical part (52) and a plurality of clutch plates (72) engaging with the center cylindrical part (62) that are alternately overlapped with each other in the axial direction in a ring-shaped space between the outer cylindrical part (52) and the center cylindrical part (62); and a pressure plate (80) that sandwiches the friction plates (71) and the clutch plates (72) alternately overlapped with each other with the center bottom wall part (61) and presses the friction plates (71) and the clutch plates (72) by a biasing force of a clutch spring (76);

the multi-plate friction clutch being characterized in that a center ring protrusion (65) protruding into a cylindrical shape from an outer surface of the center bottom wall part (61) is formed at substantially the same radial position as the plurality of communication holes (61h), a ring recess (66) opened toward the axial center is formed in an inner circumferential surface of the center ring protrusion (65), and the communication holes (61h) are so opened as to face the ring recess (66).

According to an embodiment of the present invention, an inner circumferential surface of the center cylindrical part (62) is formed radially outside relative to the communication holes (61h), and a plurality of small holes (62h) that allow the inner circumferential surface side and the outer circumferential surface side of the center cylindrical part (62) to communicate with each other are formed in the center cylindrical part (62).

According to an embodiment of the present invention, an outer ring protrusion (55) protruding into a cylindrical shape from the inner surface of the outer bottom wall part (51) is formed radially inside relative to the center ring protrusion (65), and the outer ring protrusion (55) protrudes to the axial position of the ring recess (66).

According to an embodiment of the present invention, an oil thrower groove (56) is formed into a ring shape in an outer circumferential surface of the outer ring protrusion (55).

According to an embodiment of the present invention, the axial position of the outer ring protrusion (55) overlaps with the axial position of an opening end part of a gap in which the bearing (41) to journal the outer bottom wall part (51) is interposed.

According to an embodiment of the present invention, in the multi-plate friction clutch (C) including the clutch center (60) in which the plurality of communication holes (61h) are formed in the center bottom wall part (61) at an equal distance from the axial center, the center ring protrusion (65) protruding into a cylindrical shape from the outer surface of the center bottom wall part (61) is formed at substantially the same radial position as the plurality of communication holes (61h). Furthermore, the ring recess (66) opened toward the axial center is formed in the inner circumferential surface of the center ring protrusion (65) and the communication holes (61h) are so opened as to face the ring recess (66). Therefore, oil that has leaked from the bearing (41) and has flowed out to a space between the outer bottom wall part (51) and the center bottom wall part (61) is discharged in the centrifugal direction due to rotation. Furthermore, the ring recess (66) opened toward the axial center in the center ring protrusion (65) protruding on the outer surface of the center bottom wall part (61) can efficiently receive and accumulate most of this oil discharged in the centrifugal direction. Moreover, the oil accumulated in the ring recess (66) can be made to pass through the communication holes (61h) and be efficiently supplied to lubrication sites such as the friction plates (71) and the clutch plates (72) on the inner surface side of the center bottom wall part (61). Thus, the lubrication sites in the multi-plate friction clutch (C) can be sufficiently lubricated and connection and disconnection of the clutch can be made smooth.

According to an embodiment of the present invention, the inner circumferential surface of the center cylindrical part (62) is formed radially outside relative to the communication holes (61h), and the plurality of small holes (62h) that allow the inner circumferential surface side and outer circumferential surface side of the center cylindrical part (62) to communicate with each other are formed in the center cylindrical part (62). Therefore, oil guided to the inner surface side of the center bottom wall part (61) via the communication holes (61h) passes through the small holes (62h) from the inner circumferential surface side of the center cylindrical part (62) and is smoothly supplied to the friction plates (71) and the clutch plates (72) on the outer circumferential surface side.

According to an embodiment of the present invention, the outer ring protrusion (55) protruding into a cylindrical shape from the inner surface of the outer bottom wall part (51) is formed radially inside relative to the center ring protrusion (65), and the outer ring protrusion (55) protrudes to the axial position of the ring recess (66). Therefore, oil that has leaked from the bearing (41) and has flowed out to a space between the outer bottom wall part (51) and the center bottom wall part (61) reaches the outer ring protrusion (55) protruding into a cylindrical shape from the inner surface of the outer bottom wall part (51) and flies in the centrifugal direction from the outer ring protrusion (55). Furthermore, the ring recess (66) of the center ring protrusion (65) located radially outside at the axial position of a protrusion end (55e) of the outer ring protrusion (55) can efficiently receive and accumulate the oil that flies in the centrifugal direction from the outer ring protrusion (55). Thus, the lubrication sites in the multi-plate friction clutch (C) can be sufficiently lubricated through the communication holes (61h).

According to an embodiment of the present invention, the oil thrower groove (56) is formed into a ring shape in the outer circumferential surface of the outer ring protrusion (55). Therefore, when the oil that has reached the outer ring protrusion (55) flows around the protrusion end (55e) of the outer ring protrusion (55) to the outer circumferential surface side, because of the existence of the oil thrower groove (56), little oil goes beyond the oil thrower groove (56) and flows along the inner surface of the outer bottom wall part (51), and most of the oil flies in the centrifugal direction from the protrusion end (55e) of the outer ring protrusion (55) and can be efficiently received by the ring recess (66) of the center ring protrusion (65). Thus, the lubrication sites in the multi-plate friction clutch (C) can be sufficiently lubricated through the communication holes (61h).

According to an embodiment of the present invention, the axial position of the outer ring protrusion (55) overlaps with the axial position of the opening end part of the gap in which the bearing (41) to journal the outer bottom wall part (51) is interposed. Therefore, the oil leaked from the opening end part of the gap in which the bearing (41) is interposed can be efficiently received by the inner circumferential surface of the outer ring protrusion (55) on the radially outside and be guided to the protrusion end (55e).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

One embodiment according to the present invention will be described below based on FIGS. 1 to 8.

Figure 1:
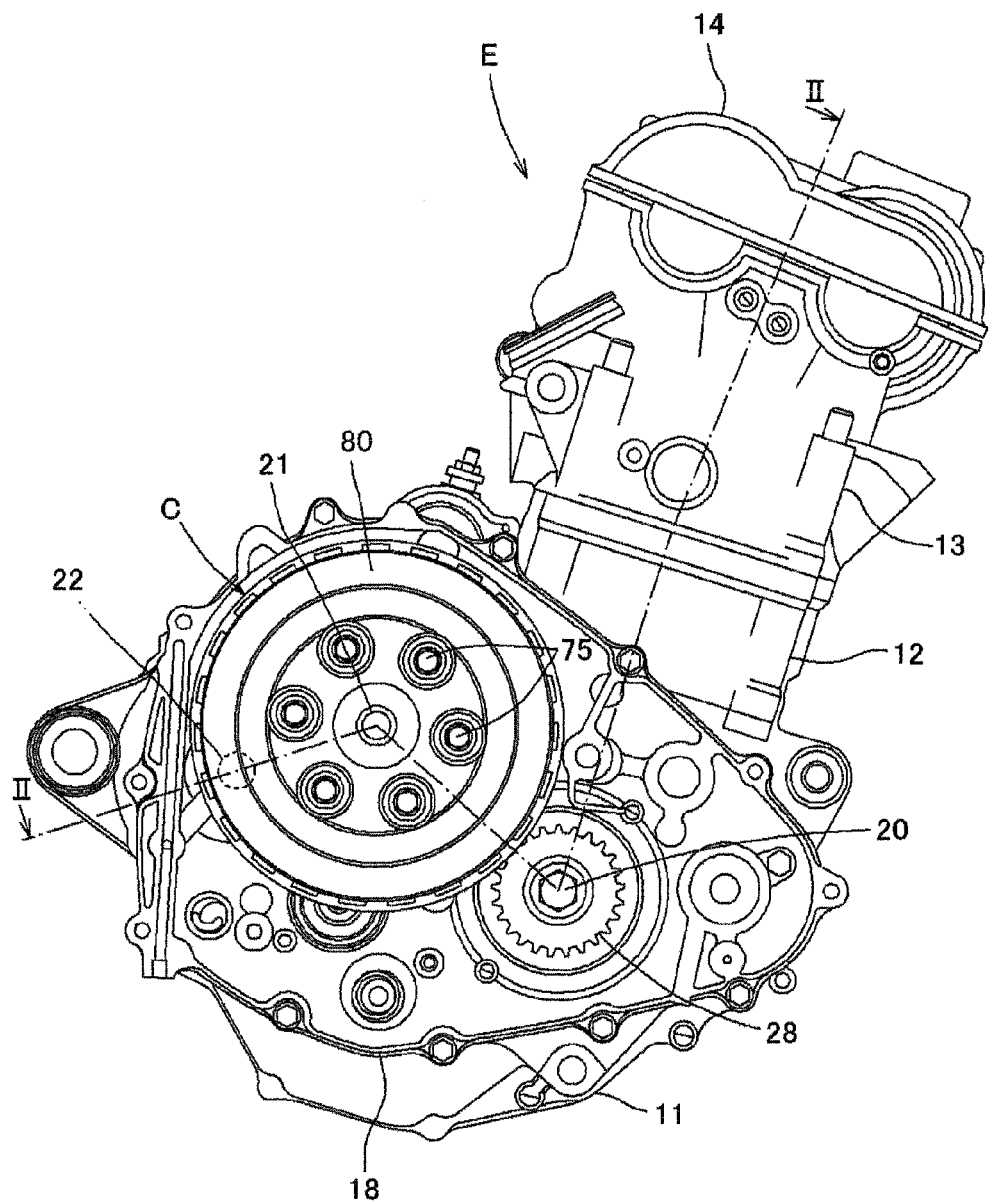
FIG. 1 is an overall side view of an internal combustion engine according to one embodiment of the present invention.
Figure 2:
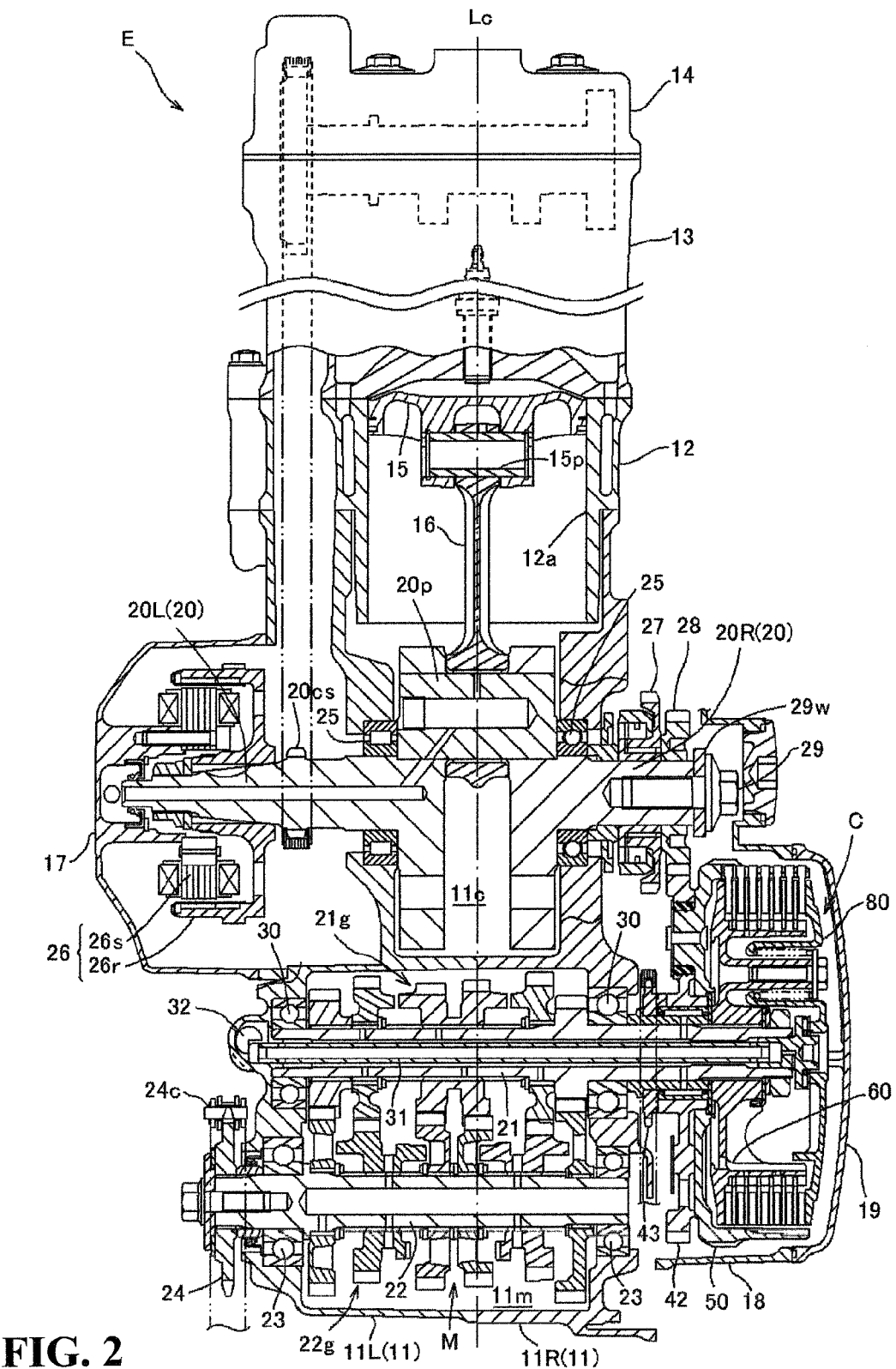
FIG. 2 is a sectional development view of the internal combustion engine (sectional view along line II-II in FIG. 1)

FIG. 1 is a right side view of an internal combustion engine E from which a case cover is removed according to one embodiment to which the present invention is applied. FIG. 2 is a sectional development view of the internal combustion engine (sectional development view along line II-II in FIG. 1).

The present internal combustion engine E is a water-cooled, single-cylinder, four-stroke internal combustion engine mounted in a motorcycle.

In the description of the present specification, the front, rear, left, and right directions shall comply with a normal basis in which a straight direction operation of the motorcycle is defined as the front direction.

A crankcase 11 that journals a crankshaft 20 along the left-right direction, which is also the vehicle width direction of the vehicle, forms a crank chamber 11c in which the crankshaft 20 is disposed. In addition, a mission chamber 11m that is partitioned by a partition wall and houses a transmission M is formed on the rear side of the crank chamber 11c.

The single-cylinder, four-stroke internal combustion engine E has, over the crank chamber 11c of the crankcase 11, an engine main body composed of a cylinder block 12 having one cylinder 12a, a cylinder head 13 joined to the upper part of the cylinder block 12 by stud bolts with the intermediary of a gasket, and a cylinder head cover 14 joined to the upper part of the cylinder head 13.

The cylinder block 12, the cylinder head 13, and the cylinder head cover 14 stacked over the crankcase 11 project upwardly with such a posture as to be slightly tilted forward from the crankcase 11.

In the mission chamber 11m of the crankcase 11, a main shaft 21 and a countershaft 22 of the transmission M are disposed in parallel to the crankshaft 20 along the left-right horizontal direction.

A pair of left crankcase 11L and right crankcase 11R split to left and right components by a plane that includes a cylinder axis line Lc and is orthogonal to the crankshaft 20 are joined to each other in a state in which their joining surfaces are mated with each other. Therefore, the crankcase 11 is formed.

The lower part of the cylinder 12a of the cylinder block 12 is fitted into a circular opening formed above the crank chamber 11c through the joining of the left and right crankcases 11L and 11R and a piston 15 is fitted into a cylinder bore of the cylinder 12a in such a manner as to be capable of reciprocation sliding.

The piston 15 is connected to the crankshaft 20 by a connecting rod 16 having a smaller end part journaled by a piston pin 15p of the piston 15 and a larger end part journaled by a crankpin 20p of the crankshaft 20. Therefore, a crank mechanism is formed.

A left shaft body 20L protruding left beyond a left main bearing 25 in the crankshaft 20 penetrates a chain chamber and furthermore penetrates an opening of the left sidewall of the left crankcase 11L. A drive cam chain sprocket 20cs is formed at the part equivalent to the chain chamber and an outer rotor 26r of an AC generator 26 is fitted at the left end of the left shaft body 20L.

A left side cover 17 that seals the opening of the left sidewall of the left crankcase 11L covers the AC generator 26 and supports an inner stator 26s of the AC generator 26.

On the other hand, to the right shaft body 20R protruding right beyond a right main bearing 25 of the right crankcase 11R in the crankshaft 20, a starter driven gear 27 and a primary drive gear 28 are fitted in that order from the side of the main bearing 25 and are fastened by a flanged bolt 29 with the intermediary of a washer 29w (see FIG. 2).

The transmission M disposed in the mission chamber 11m on the rear side of the crank chamber 11c includes the main shaft 21 and the countershaft 22 provided with a main gear group 21g and a counter gear group 22g, respectively, and a gear change mechanism with a shift drum and a shift fork (not shown) operated by a gearshift operation mechanism.

The main shaft 21 exists on the rear side and obliquely upper side of the crankshaft 20 and is rotatably journaled by the left and right crankcases 11L and 11R with the intermediary of bearings 30. A multi-plate friction clutch C is provided at the part protruding right beyond the right bearing 30 in the main shaft 21.

The countershaft 22 exists on the rear side and obliquely lower side of the main shaft 21 and is rotatably journaled by the left and right crankcases 11L and 11R with the intermediary of bearings 23. The countershaft 22 penetrates left beyond the left bearing 23 and protrudes to the external to serve as an output shaft, and a drive chain sprocket 24 is fitted to the protruding left end of the countershaft 22.

A drive chain 24c wound around the drive chain sprocket 24 is wound around a driven chain sprocket (not shown) on the rear wheel side and power is transmitted to the rear wheel.

The right side surface of the right crankcase 11R is covered by a right crankcase cover 18 and a clutch cover 19 that seals an opening the multi-plate friction clutch C faces in the right crankcase cover 18 covers the right side of the multi-plate friction clutch C.

A shaft hole 21h is formed along the shaft core of the main shaft 21 and a clutch actuating rod 31 is inserted therein.

The clutch actuating rod 31 is slidably supported at left and right diameter-reduced parts of the shaft hole 21h and is moved right in the axial direction by actuation of a clutch cam 32 that acts on the left end.

Oil discharged from a scavenge pump is supplied to the shaft hole 21h.

Figure 3:
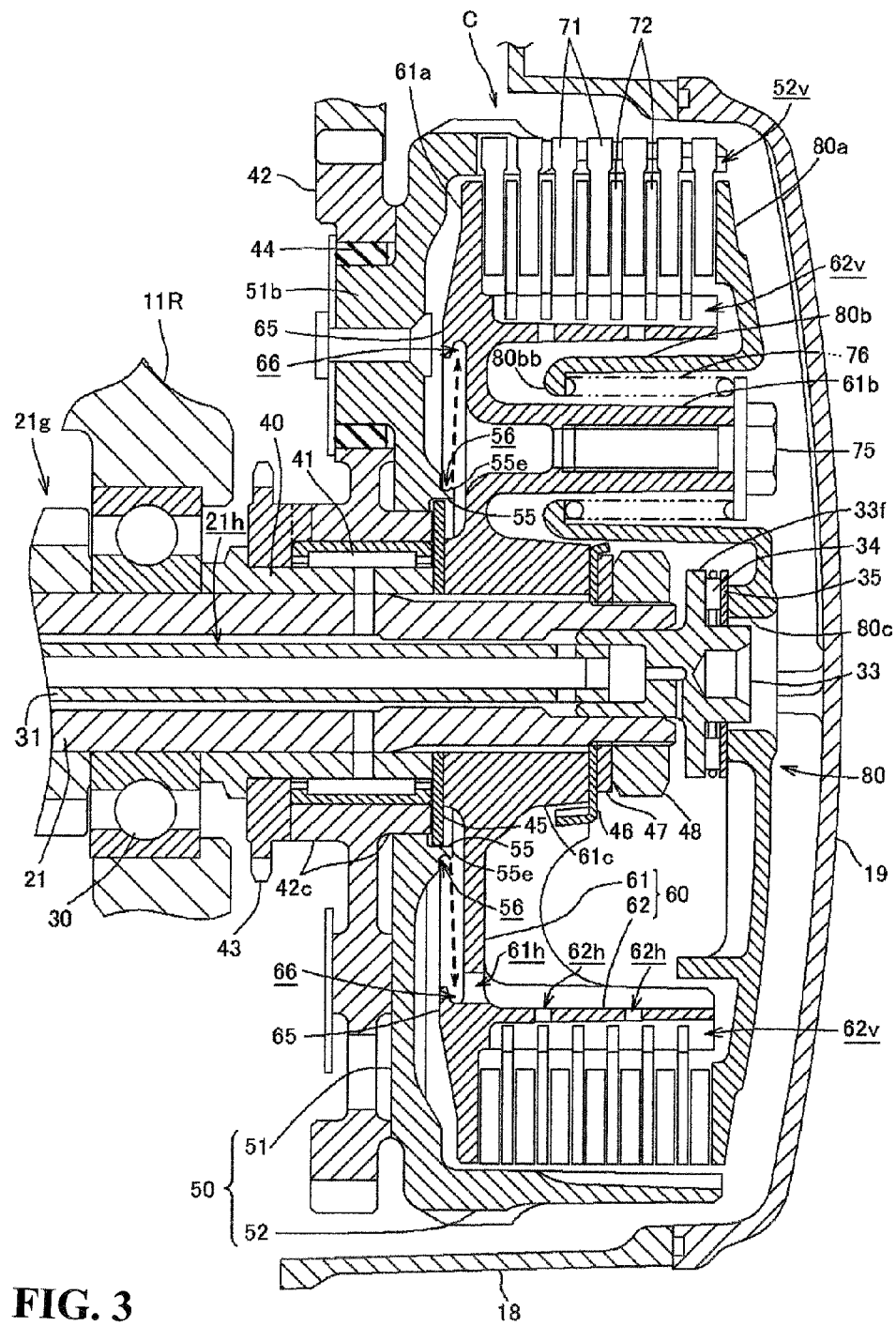
FIG. 3 is an enlarged sectional view of a multi-plate friction clutch and surroundings thereof.
Figure 4:
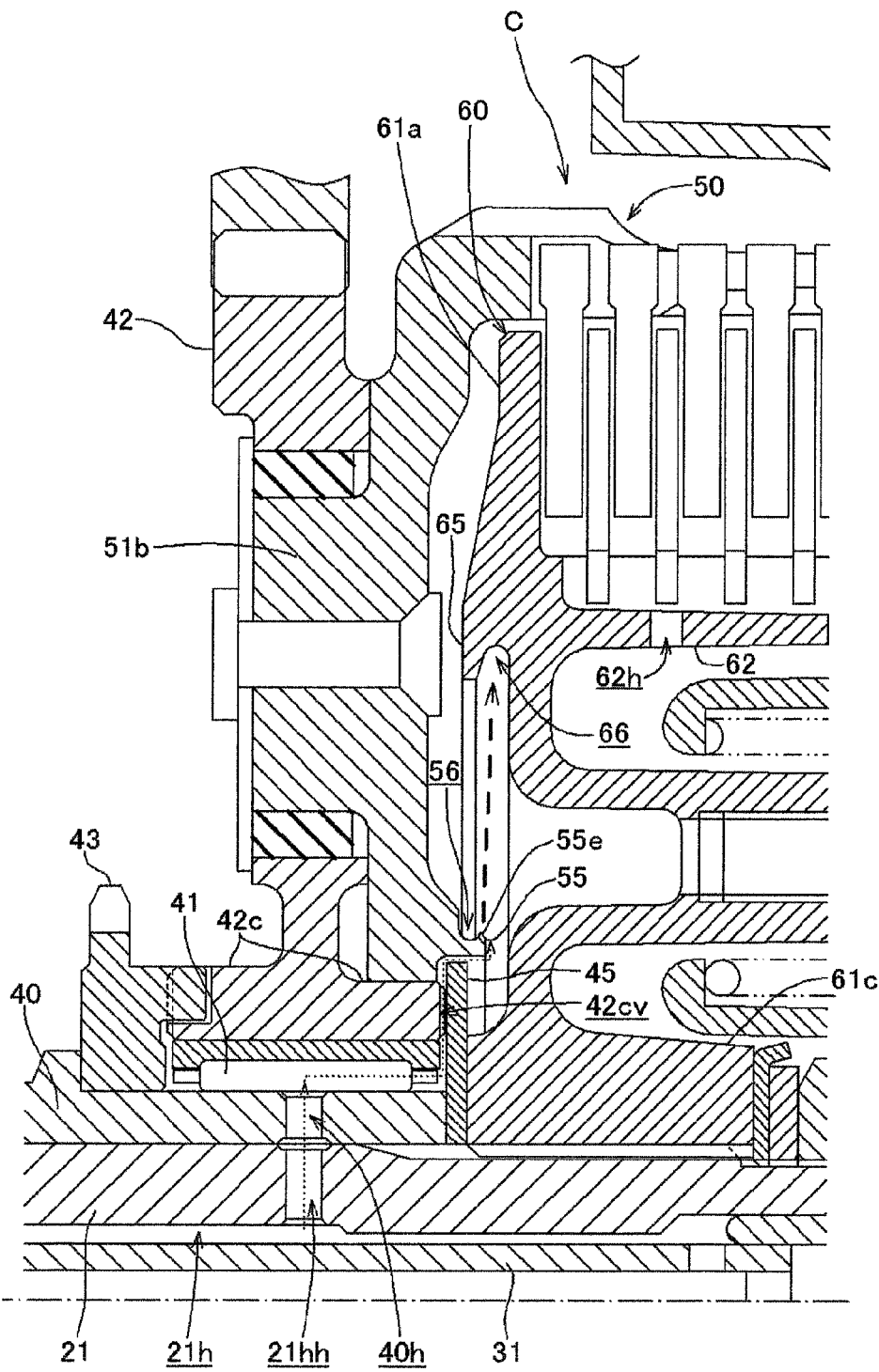
FIG. 4 is an enlarged sectional view of a major part in FIG. 3.
Figure 5:
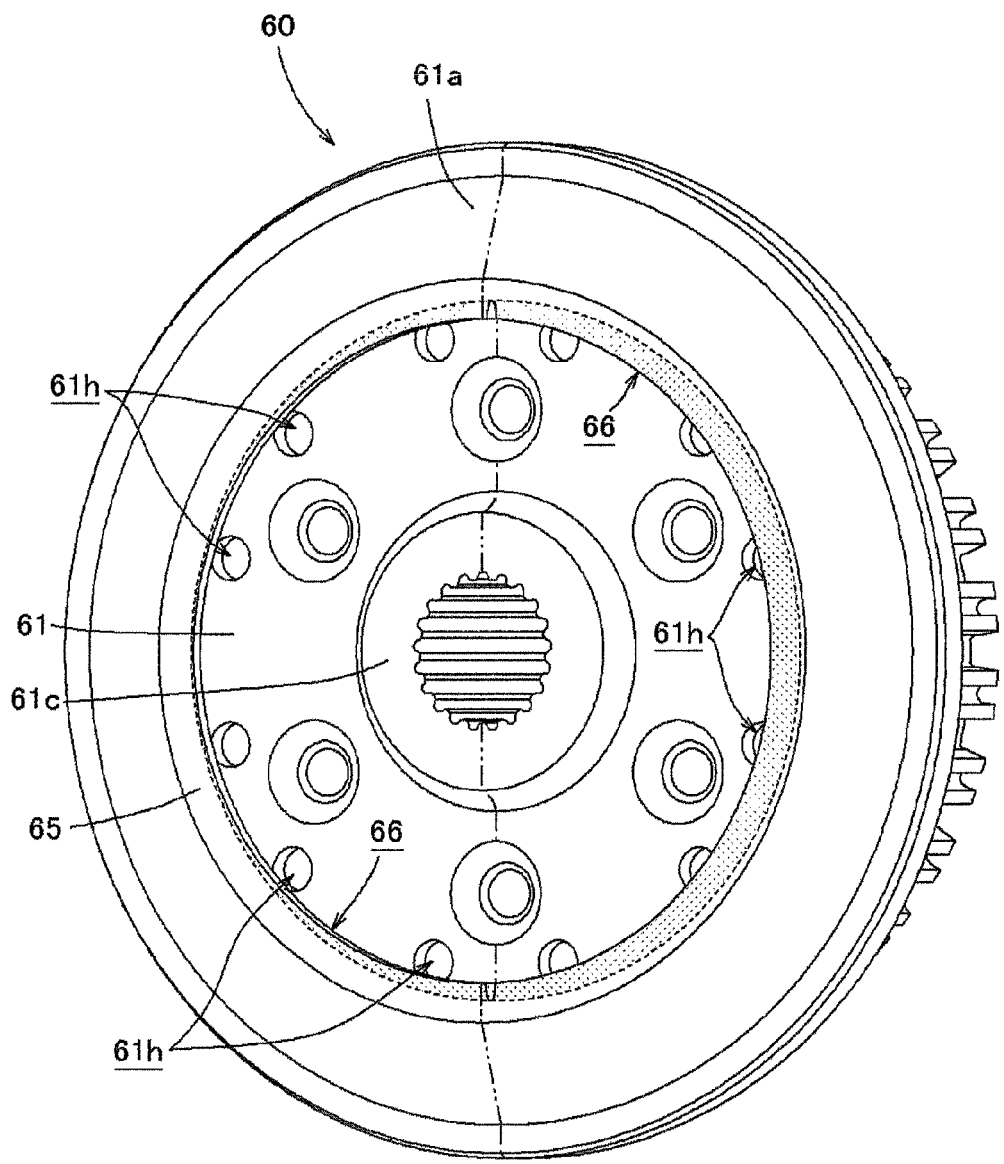
FIG. 5 is a perspective view as viewed from the obliquely left side of a clutch center.
Figure 6:
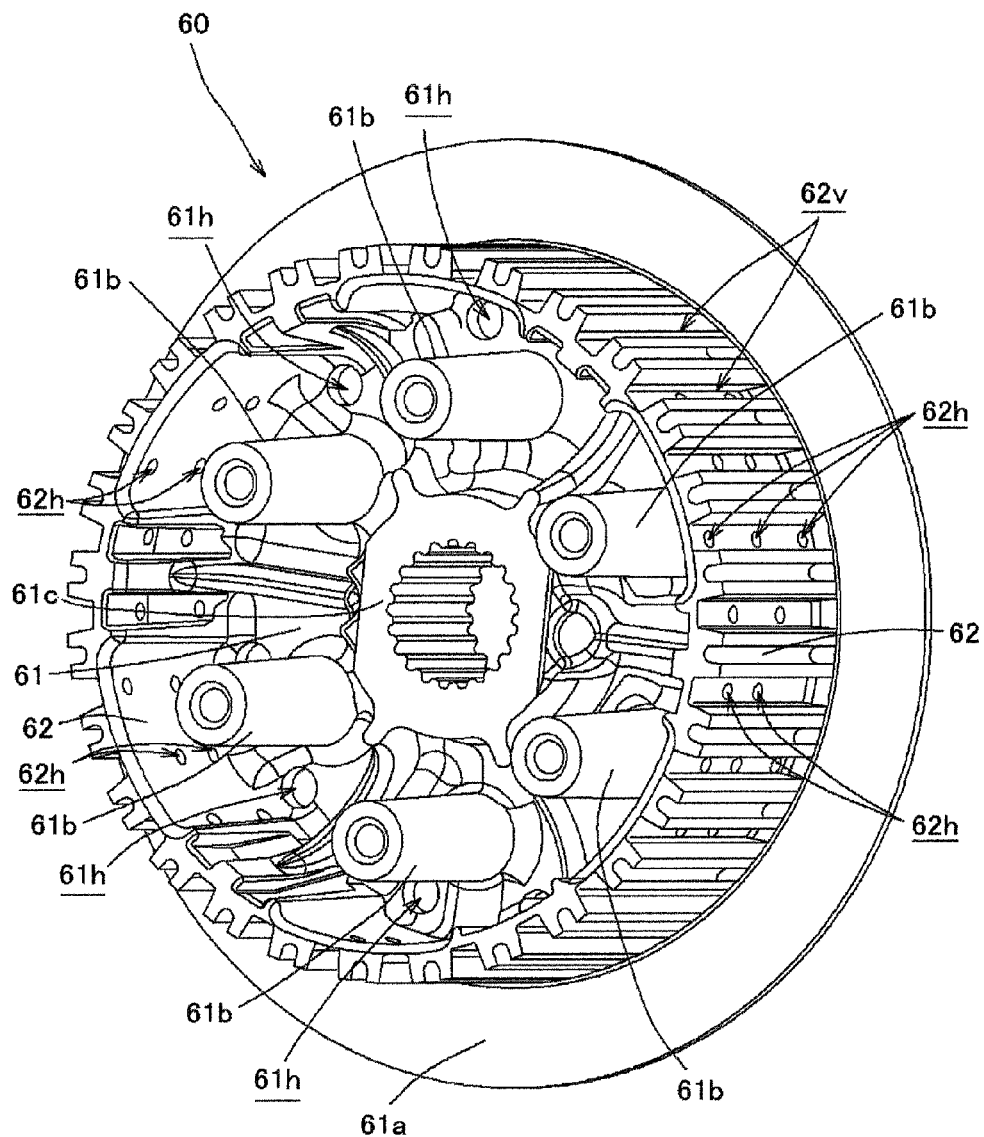
FIG. 6 is a perspective view as viewed from the obliquely right side of the clutch center.
Figure 7:
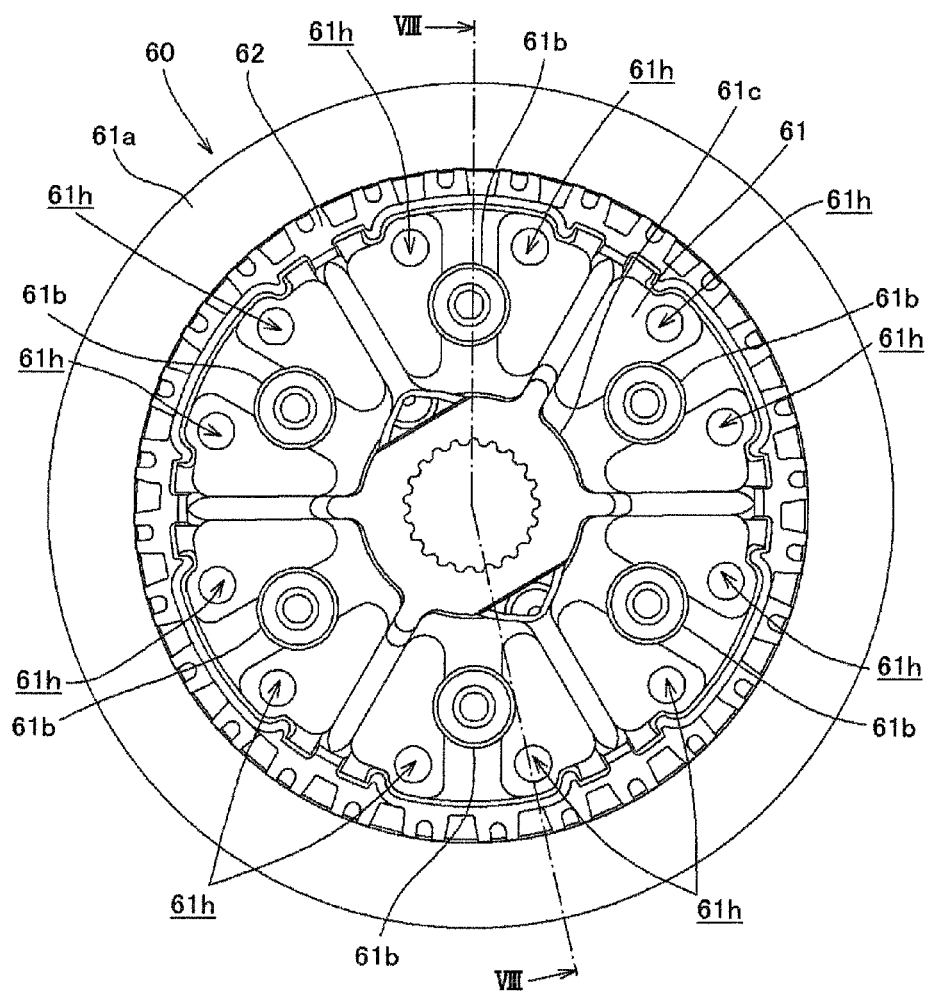
FIG. 7 is a left front view of the clutch center.
Figure 8:
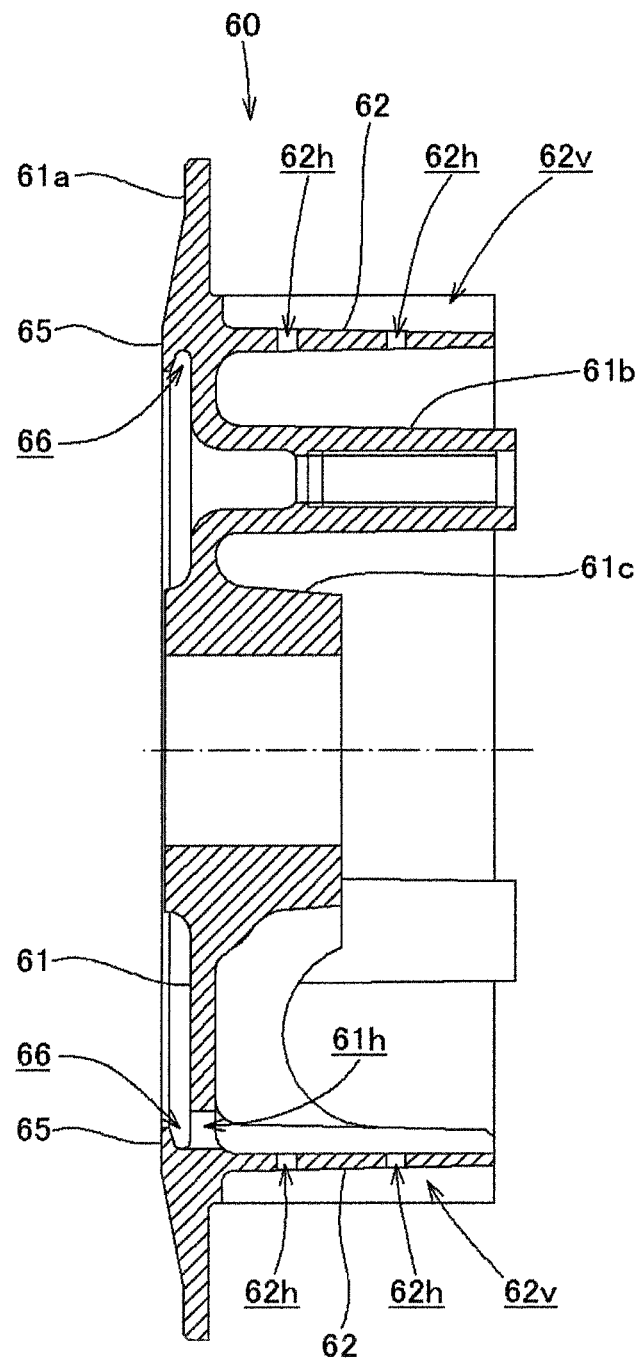
FIG. 8 is a sectional view of the clutch center (sectional view along line VIII-VIII in FIG. 7).

Referring to FIGS. 3 and 4, a sleeve member 40 is fitted to the external of the main shaft 21 in such a manner as to get contact with the inner race of the right bearing 30 from the right side and a primary driven gear 42 is rotatably journaled by the sleeve member 40 with the intermediary of a needle bearing 41.

The primary driven gear 42 meshes with the primary drive gear 28 fitted to the crankshaft 20.

An oil pump drive sprocket 43 is journaled on the sleeve member 40 with engagement with the left end of a central cylindrical boss part 42c fitted to the external of the needle bearing 41 in the primary driven gear 42.

In the right end surface of the central cylindrical boss part 42c of the primary driven gear 42, a plurality of oil grooves 42cv are formed along the radial direction.

A clutch outer 50 in the multi-plate friction clutch C is formed into a bottomed cylindrical shape (bowl shape) with an outer bottom wall part 51 rotatably journaled by the main shaft 21 and an outer cylindrical part 52 extending right along the axial direction into a cylindrical shape from the peripheral edge of the outer bottom wall part 51. The outer bottom wall part 51 of this clutch outer 50 is so supported as to be in contact with a disc part of the primary driven gear 42 and be journaled by the central cylindrical boss part 42c of the primary driven gear 42.

Furthermore, a damper rubber 44 held by being press-fitted to the outer circumference of a holding boss part 51b protruding on the outer surface of the outer bottom wall part 51 is fitted into a circular hole 42h formed in the disc part of the primary driven gear 42, and absorbs drastic torque variation between the primary driven gear 42 and the clutch outer 50.

Therefore, the rotation of the crankshaft 20 is transmitted to the clutch outer 50 of the multi-plate friction clutch C via the meshing between the primary drive gear 28 and the primary driven gear 42 and via the damper rubber 44.

In a clutch center 60 in the multi-plate friction clutch C, a center bottom wall part 61 that is opposed to the inner surface of the outer bottom wall part 51 and is journaled by the main shaft 21 and a center cylindrical part 62 extending into a cylindrical shape from the center bottom wall part 61 to the opposite side to the outer bottom wall part 51 (right side).

A central cylindrical boss part 61c of the center bottom wall part 61 of the clutch center 60 is spline-fitted to the main shaft 21. Therefore, the center bottom wall part 61 is journaled with its relative rotation restricted.

A male screw is formed at the right end part of the main shaft 21 and spline grooves are formed across a certain distance on the left side of the male screw. The central cylindrical boss part 61c of the center bottom wall part 61 is fitted to the spline grooves with a washer 45 set between the central cylindrical boss part 61c and an end surface of the sleeve member 40. Furthermore, a nut member 48 is screwed to the male screw with an intervening metal piece 46 and a washer 47 set between the nut member 48 and the central cylindrical boss part 61c to secure the central cylindrical boss part 61c (and the sleeve member 40) between the nut member 48 and the inner race of the bearing 30. Therefore, the clutch center 60 is fixed at a predetermined position on the main shaft 21.

When the clutch center 60 is fixed at the predetermined position on the main shaft 21, the center cylindrical part 62 of the clutch center 60 is located inside the outer cylindrical part 52 and on a concentric circle separate from the outer cylindrical part 52 by a predetermined distance.

The outer diameter of the washer 45, which is set between the end surface of the sleeve member 40 and the central cylindrical boss part 61c of the center bottom wall part 61, is slightly larger than the outer diameter of the central cylindrical boss part 42c of the primary driven gear 42. Furthermore, the washer 45 is close to the right end surface of the central cylindrical boss part 42c, in which the oil grooves 42cv are formed, and the needle bearing 41. Therefore, the washer 45 allows smooth relative rotation between the primary driven gear 42 and the clutch center 60 at the outer periphery of the sleeve member 40, which rotates integrally with the main shaft 21.

An outer ring protrusion 55 protrudes into a flattened cylindrical shape from the position of a circular ring having a diameter slightly larger than the outer diameter of the washer 45 on the inner surface (right side surface) of the outer bottom wall part 51 of the clutch outer 50.

The outer ring protrusion 55 protrudes right from the outer bottom wall part 51 beyond the washer 45 and surrounds the washer 45. Therefore, the axial position of the outer ring protrusion 55 overlaps with that of the right end of the central cylindrical boss part 42c (right opening end part of the gap in which the needle bearing 41 is interposed).

The outer circumferential surface of the outer ring protrusion 55 is tapered and an oil thrower groove 56 is formed into a ring shape near a protrusion end 55e of the outer ring protrusion 55 with this outer circumferential tapered surface.

Referring to FIGS. 3 to 8, in the clutch center 60, a plurality of communication holes 61h are formed in the center bottom wall part 61 at an equal distance from the axial center across the circumferential direction and allow the outer surface side and inner surface side of the center bottom wall part 61 to communicate with each other.

The inner circumferential surface of the center cylindrical part 62 protruding from the inner surface of the center bottom wall part 61 is located radially outside relative to the plurality of communication holes 61h existing at the equal distance from the axial center. Thus, the communication holes 61h allow the outer surface side of the center bottom wall part 61 to communicate with the inside of the center cylindrical part 62 as well as the inner surface side of the center bottom wall part 61.

A center ring protrusion 65 protrudes into a flattened cylindrical shape on the outer surface of the center bottom wall part 61, and is formed at substantially the same radial position as the plurality of communication holes 61h.

A ring recess 66 opened toward the axial center (part indicated by a scattered-dot pattern in FIG. 5) is formed into a ring shape in the inner circumferential surface of the center ring protrusion 65. The communication holes 61h are opened so as to face the ring recess 66.

When the clutch outer 50 and the clutch center 60 are assembled to the main shaft 21, the outer ring protrusion 55 protruding from the inner surface of the outer bottom wall part 51 of the clutch outer 50 exists on the inner circumferential side of the center ring protrusion 65 protruding from the outer surface of the center bottom wall part 61 of the clutch center 60 and protrudes to the axial position of the ring recess 66 of the center ring protrusion 65.

More specifically, the protrusion end 55e of the outer ring protrusion 55 and the ring recess 66 of the center ring protrusion 65 are in such a positional relationship as to be located at the same axial position and radially inside and outside.

In the center cylindrical part 62 of the clutch center 60, a plurality of small holes 62h that allow the inner circumferential side and outer circumferential side of the center cylindrical part 62 to communicate with each other are drilled.

In the center bottom wall part 61, at positions at an equal distance from the axial center and on a circular ring with a smaller diameter than the circular ring on which the plurality of communication holes 61h are arranged, six cylindrical boss parts 61b are so formed as to protrude toward the axially outside (right side) to a large extent at equal intervals in the circumferential direction.

A plurality of friction plates 71 and a plurality of clutch plates 72 are alternately inserted and fitted in a ring-shaped space between the outer cylindrical part 52 and the center cylindrical part 62, which concentrically overlap with each other.

A plurality of outer circumferential protrusions formed at the outer circumferential edges of the friction plates 71 slidably engage with grooves 52v that are made in the inner circumferential surface of the outer cylindrical part 52 along the axial direction and formed as a plurality of grooves in the circumferential direction. Thus, the friction plates 71 rotate together with the clutch outer 50.

Furthermore, a plurality of inner circumferential protrusions formed at the inner circumferential edges of the clutch plates 72 slidably engage with grooves 62v that are made in the outer circumferential surface of the center cylindrical part 62 along the axial direction and formed as a plurality of grooves in the circumferential direction. Thus, the clutch plates 72 rotate together with the clutch center 60.

On the back side (left side) of the ring space between the outer cylindrical part 52 and the center cylindrical part 62, in which the friction plates 71 and the clutch plates 72 are inserted and fitted, a peripheral part 61a of the center bottom wall part 61 of the clutch center 60 is located and opposed to the friction plate 71 inserted and fitted at the backmost position.

A pressure plate 80 presses the plurality of friction plates 71 and the plurality of clutch plates 72 alternately inserted and fitted by sandwiching them with the peripheral part 61a of the center bottom wall part 61.

The pressure plate 80 has a shape of a circular disc slightly curving and a peripheral part 80a thereof sandwiches, from the right side, the plurality of friction plates 71 and the plurality of clutch plates 72 alternately overlapping with each other with the peripheral part 61a of the center bottom wall part 61.

A central boss part 80c of the pressure plate 80 is pressed by the clutch actuating rod 31, thereby operating the pressure plate 80.

A cap member 33 placed on the tip (right end) of the clutch actuating rod 31 protrudes from an opening at a shaft end of the main shaft 21 and forms a flange part 33f. This flange part 33f is opposed to a ring side plate 35 made to abut against the central boss part 80c of the pressure plate 80 and a thrust bearing 34 is set therebetween.

At radial positions between the central boss part 80c and the peripheral part 80a of the pressure plate 80, large-diameter cylindrical boss parts 80b that each correspond to a respective one of the six cylindrical boss parts 61b protruding from the center bottom wall part 61 of the clutch center 60 and have a larger diameter than the cylindrical boss parts 61b are so formed as to protrude toward the axially inside (left side) to a large extent and cover the respective cylindrical boss parts 61b.

A female screw is engraved in the tip-side inner circumferential surface of the cylindrical boss part 61b of the clutch center 60 and a flanged bolt 75 is screwed thereto.

A clutch spring 76 is compressed and interposed between a tip bending part 80bb bending inward at the tip of the large-diameter cylindrical boss part 80b of the pressure plate 80 and the flange part of the flanged bolt 75 screwed to the cylindrical boss part 61b of the clutch center 60.

Therefore, a biasing force acts on the pressure plate 80 toward the axially inside (left side) due to the spring force of the clutch spring 76 and the peripheral part 80a of the pressure plate 80 clamps the friction plates 71 and the clutch plates 72 alternately overlapped with each other with the peripheral part 61a of the center bottom wall part 61. This provides a clutch-connected state in which the rotation of the clutch outer 50 is transmitted to the clutch center 60 via the friction plates 71 and the clutch plates 72 brought into pressure contact with each other.

When the clutch actuating rod 31 is moved right by operation of the clutch cam 32, the pressure plate 80 is pressed via the cap member 33 and the thrust bearing 34 and moves right against the biasing force of the clutch spring 76. This can provide a clutch-disconnected state in which the clamping of the friction plates 71 and the clutch plates 72 between the pressure plate 80 and the peripheral part 61a of the center bottom wall part 61 is released and thus the rotation of the clutch outer 50 is not transmitted to the clutch center 60.

As shown by a dotted arrow in FIG. 4, when the internal combustion engine E is operating and the crankshaft 20 is rotating, oil introduced into the shaft hole 21h of the main shaft 21 through driving of a scavenge pump is split into a branch hole 21hh branching from the shaft hole 21h in the radial direction and is supplied to the respective journaling parts of the main gear group 21g. In addition, the oil is also supplied to the needle bearing 41 as the journaling part of the primary driven gear 42, which supports the clutch outer 50.

The sleeve member 40 also has a hole 40h communicating with the branch hole 21hh and guiding the oil to the needle bearing 41 (see FIG. 4).

Referring to the dotted arrow in FIG. 4, the oil supplied to the needle bearing 41 lubricates the needle bearing 41. Thereafter, the oil gets out from the right opening of the gap in which the needle bearing 41 is interposed between the sleeve member 40 and the central cylindrical boss part 42c of the primary driven gear 42, which rotates relative to the sleeve member 40, and passes through the oil grooves 42cv formed between the right end surface of the central cylindrical boss part 42c and the washer 45. Then, the oil leaks and flows out to the inner circumferential surface of the outer ring protrusion 55 protruding on the outer bottom wall part 51 of the clutch outer 50, which rotates together with the primary driven gear 42.

The outer ring protrusion 55 exists at a position overlapping with, in the axial direction, the right opening end part of the gap in which the needle bearing 41 is interposed. Thus, the oil that has passed from the needle bearing 41 through the oil grooves 42cv to leak efficiently flows out to the inner circumferential surface of the outer ring protrusion 55.

The oil that flowed out to the inner circumferential surface of the rotating outer ring protrusion 55 flows around the protrusion end 55e of the outer ring protrusion 55 to the outer circumferential surface side. However, because the oil thrower groove 56 exists, little oil goes beyond the oil thrower groove 56 and flows along the inner surface of the outer bottom wall part 51, and most of the oil flies from the protrusion end 55e of the outer ring protrusion 55 in the centrifugal direction between the outer bottom wall part 51 and the center bottom wall part 61 due to the centrifugal force of the rotating clutch outer 50.

The outer ring protrusion 55 protruding from the inner surface of the outer bottom wall part 51 protrudes to the axial position of the ring recess 66 of the center ring protrusion 65. Therefore, the protrusion end 55e of the outer ring protrusion 55 and the ring recess 66 of the center ring protrusion 65 are in such a positional relationship as to be located at the same axial position and radially inside and outside. Therefore, as shown by dashed arrows in FIGS. 3 and 4, the oil that flies in the centrifugal direction from the protrusion end 55e of the outer ring protrusion 55 is efficiently received by the ring recess 66 opened toward the axial center in the center ring protrusion 65.

Part of the oil that flies from the protrusion end 55e of the outer ring protrusion 55 adheres to the outer surface of the center bottom wall part 61. However, when the clutch center 60 rotates, the oil flows in the centrifugal direction along the outer surface of the center bottom wall part 61 and enters the ring recess 66 of the center ring protrusion 65.

Therefore, the oil that has lubricated the needle bearing 41, which journals the primary driven gear 42 and the clutch outer 50, flows out to the space between the outer bottom wall part 51 and the center bottom wall part 61. Then, the oil flies in the centrifugal direction from the protrusion end 55e of the outer ring protrusion 55 and most of the oil enters the ring recess 66 of the center ring protrusion 65 and accumulates therein.

The oil accumulated in the ring recess 66 of the center ring protrusion 65 passes through the plurality of communication holes 61h, which are so opened as to face the ring recess 66, and flows from the outer surface side of the center bottom wall part 61 to the inner surface side to flow out to the inner circumferential surface side of the center cylindrical part 62.

Because the plurality of small holes 62h are drilled in the center cylindrical part 62, the oil that has flowed out to the inner circumferential surface side of the center cylindrical part 62 passes through the plurality of small holes 62h to be supplied to the friction plates 71 and the clutch plates 72 alternately overlapped with each other on the outer circumferential surface side of the center cylindrical part 62.

As described above, in the present multi-plate friction clutch C, the ring recess 66 of the center ring protrusion 65 of the clutch center 60 efficiently receives the oil that has lubricated the needle bearing 41, which journals the primary driven gear 42 and the clutch outer 50, and most of the oil is accumulated in the ring recess 66. This accumulated oil passes through the communication holes 61h and the small holes 62h to be supplied to the friction plates 71 and the clutch plates 72. Therefore, lubrication sites such as the friction plates 71 and the clutch plates 72 in the multi-plate friction clutch can be lubricated by being sufficiently supplied with the oil efficiently, so that the multi-plate friction clutch C can be smoothly connected and disconnected.

The oil is supplied to the needle bearing 41, which journals the clutch outer 50, by a scavenge pump. Therefore, the hydraulic pressure is lower than that with a feed pump and the amount of supply is not so large. However, the oil can be efficiently recovered to be guided to the multi-plate friction clutch C in the above-described manner and lubrication sites can be sufficiently lubricated.

If the oil is supplied by a feed pump, the capacity of the feed pump can be lowered.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multi-plate friction clutch comprising:
   a clutch outer having a bottomed cylindrical shape wherein an outer cylindrical part extends along an axial direction from an outer circumferential edge of an outer bottom wall part whose center is journaled by a rotation shaft with intermediary of a bearing;
   a clutch center in which a center cylindrical part is formed inside the outer cylindrical part and extends toward an opposite side to the outer bottom wall part from a center bottom wall part whose center is journaled by the rotation shaft with restriction of relative rotation, the center bottom wall part being opposed to an inner surface of the outer bottom wall part and having a plurality of communication holes formed at an equal distance from an axial center;
   a plurality of friction plates engaging with the outer cylindrical part and a plurality of clutch plates engaging with the center cylindrical part that are alternately overlapped with each other in the axial direction in a ring-shaped space between the outer cylindrical part and the center cylindrical part; and
   a pressure plate sandwiching the friction plates and the clutch plates alternately overlapped with each other with the center bottom wall part for pressing the friction plates and the clutch plates by a biasing force of a clutch spring;
   the multi-plate friction clutch comprising:
   a center ring protrusion protruding into a cylindrical shape from an outer surface of the center bottom wall part is formed at substantially the same radial position as the plurality of communication holes;
   a ring recess opened toward the axial center is formed in an inner circumferential surface of the center ring protrusion; and
   said communication holes are opened so as to face the ring recess,
   wherein an outer ring protrusion protruding into a cylindrical shape from the inner surface of the outer bottom wall part is formed radially inside, relative to the center ring protrusion; and the outer ring protrusion protrudes to an axial position of the ring recess; and
   wherein an oil thrower groove is formed into a ring shape in an outer circumferential surface of the outer ring protrusion.

2. The multi-plate friction clutch according to claim 1, wherein:
   an inner circumferential surface of the center cylindrical part is formed radially outside relative to the communication holes; and
   a plurality of small holes that allow an inner circumferential surface side and an outer circumferential surface side of the center cylindrical part to communicate with each other are formed in the center cylindrical part.

3. The multi-plate friction clutch according to claim 1, wherein an axial position of the outer ring protrusion overlaps with an axial position of an opening end part of a gap in which the bearing to journal the outer bottom wall part is interposed.

4. A multi-plate friction clutch comprising:
   a clutch outer having a bottomed cylindrical shape wherein an outer cylindrical part extends along an axial direction from an outer circumferential edge of an outer bottom wall part whose center is journaled by a rotation shaft with intermediary of a bearing;
   a clutch center in which a center cylindrical part is formed inside the outer cylindrical part and extends toward an opposite side to the outer bottom wall part from a center bottom wall part whose center is journaled by the rotation shaft with restriction of relative rotation, the center bottom wall part being opposed to an inner surface of the outer bottom wall part and having a plurality of communication holes;
   a plurality of friction plates engaging with the outer cylindrical part and a plurality of clutch plates engaging with the center cylindrical part that are alternately overlapped with each other in the axial direction in a ring-shaped space between the outer cylindrical part and the center cylindrical part; and
   a pressure plate sandwiching the friction plates and the clutch plates alternately overlapped with each other with the center bottom wall part for pressing the friction plates and the clutch plates by a biasing force of a clutch spring;
   the multi-plate friction clutch comprising:
   a cylindrical shaped center ring protrusion protruding from an outer surface of the center bottom wall part;
   a ring recess opened toward the axial center, said ring recess being formed in an inner circumferential surface of the center ring protrusion; and
   said communication holes being in communication with the ring recess,
   wherein an outer ring protrusion protruding into a cylindrical shape from the inner surface of the outer bottom wall part is formed radially inside, relative to the center ring protrusion; and the outer ring protrusion protrudes to an axial position of the ring recess; and wherein an oil thrower groove is formed into a ring shape in an outer circumferential surface of the outer ring protrusion.

5. The multi-plate friction clutch according to claim 4, wherein:
- an inner circumferential surface of the center cylindrical part is formed radially outside relative to the communication holes; and
- a plurality of small holes that allow an inner circumferential surface side and an outer circumferential surface side of the center cylindrical part to communicate with each other are formed in the center cylindrical part.

6. The multi-plate friction clutch according to claim 4, wherein an axial position of the outer ring protrusion overlaps with an axial position of an opening end part of a gap in which the bearing to journal the outer bottom wall part is interposed.

7. A multi-plate friction clutch comprising:
- a clutch outer having a bottomed cylindrical shape wherein an outer cylindrical part extends along an axial direction from an outer circumferential edge of an outer bottom wall part with a center being journaled by a rotation shaft supporting on a bearing;
- a clutch center wherein a center cylindrical part is formed inside the outer cylindrical part and extends toward an opposite side to the outer bottom wall part from a center bottom wall part whose center is journaled by the rotation shaft with restriction of relative rotation, the center bottom wall part being opposed to an inner surface of the outer bottom wall part and having a plurality of communication holes;
- a plurality of friction plates engaging with the outer cylindrical part and a plurality of clutch plates engaging with the center cylindrical part, said plurality of friction plates and said plurality of clutch plates being alternately overlapped with each other in the axial direction in a ring-shaped space between the outer cylindrical part and the center cylindrical part; and
- a pressure plate sandwiching the friction plates and the clutch plates alternately overlapped with each other with the center bottom wall part for pressing the friction plates and the clutch plates by a biasing force of a clutch spring;

the multi-plate friction clutch comprising:
a cylindrical center ring protrusion protruding from an outer surface of the center bottom wall part, said cylindrical center ring protrusion being formed at substantially the same radial position as the plurality of communication holes; and
- a ring recess formed in an inner circumferential surface of the cylindrical center ring protrusion, said ring recess being opened toward the axial center;
- wherein oil supplied in a centrifugal direction is, received by the ring recess and is supplied to said communication holes being in communication with the ring recess,
- wherein an outer ring protrusion protruding into a cylindrical shape from the inner surface of the outer bottom wall part is formed radially inside relative to the cylindrical center ring protrusion; and the outer ring protrusion protrudes to an axial position of the ring recess; and
- wherein an oil thrower groove is formed into a ring shape in an outer circumferential surface of the outer ring protrusion.

8. The multi-plate friction clutch according to claim 7, wherein:
- an inner circumferential surface of the center cylindrical part is formed radially outside relative to the communication holes; and a plurality of small holes that allow an inner circumferential surface side and an outer circumferential surface side of the center cylindrical part to communicate with each other are formed in the center cylindrical part.

9. The multi-plate friction clutch according to claim 7, wherein an axial position of the outer ring protrusion overlaps with an axial position of an opening end part of a gap in which the bearing to journal the outer bottom wall part is interposed.

* * * * *